Patented Oct. 1, 1946

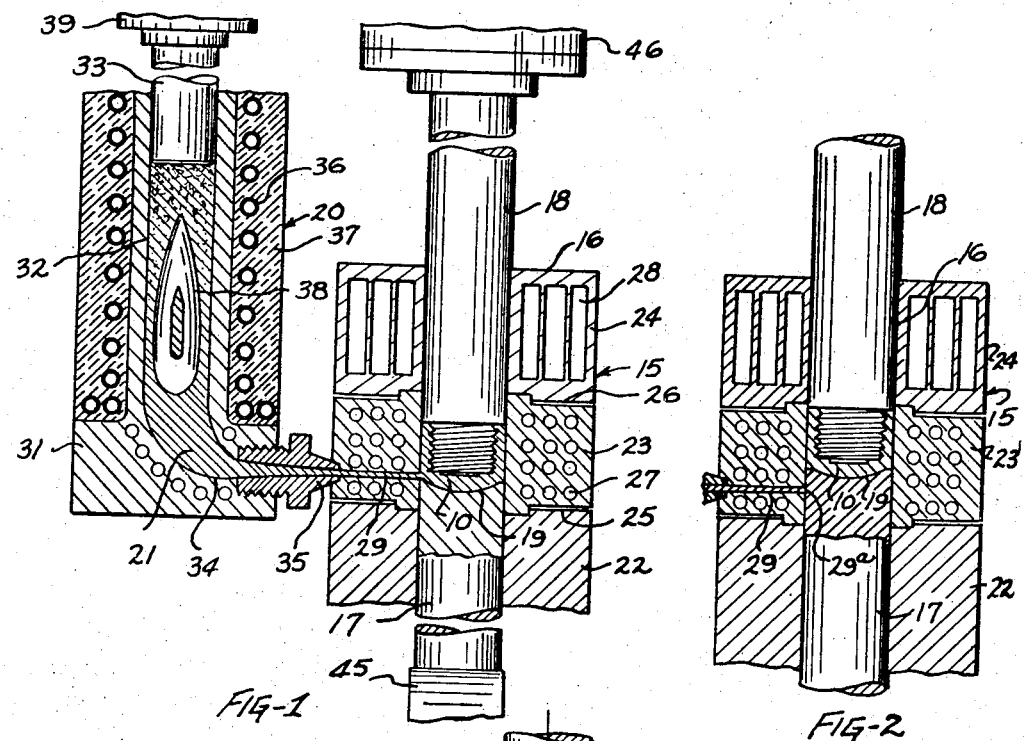
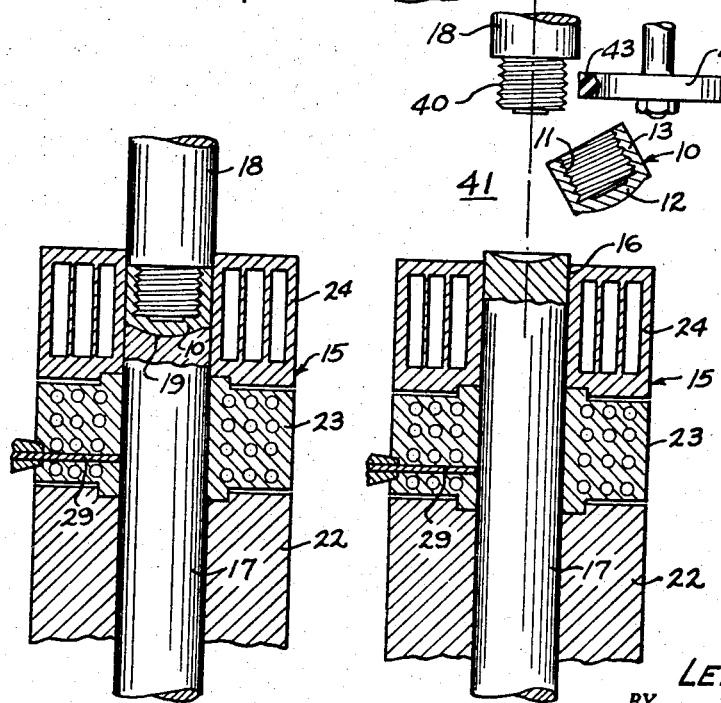

2,408,629

UNITED STATES PATENT OFFICE 2,408,629

MOLDING APPARATUS AND METHOD

Lee B. Green, Lakewood, Ohio

Application October 21, 1943, Serial No. 507,118

7 Claims. (Cl. 18—30)

This invention relates to the molding of plastic material and aims to provide a novel method and apparatus by which plastic articles can be rapidly and economically produced and wherein such articles will require no trimming operation and are substantially entirely free of the irregularities heretofore resulting from the flash or gate material usually attached to molded articles.

Another object of my invention is to provide a novel method and apparatus for molding articles from plastic material in which a pair of opposed plungers are slidable in a mold opening for defining the mold cavity and for shifting such cavity with the molded material therein.

A further object of my invention is to provide a novel method and apparatus for molding thermoplastic material in which the mold body has heated and cooled sections and the movement of the plungers is utilized to shift the mold cavity from the heated sections to the cooled section.

Still another object of my invention is to provide a novel method and apparatus by which an article being molded from plastic material in a die cavity can be subjected to an increased molding pressure in the same cavity and molding operation for increasing the density of the article.

Other objects and advantages of the invention will be apparent from the following description when taken in conjunction with the accompanying sheet of drawings in which:

Fig. 1 is a partial longitudinal sectional view taken through molding apparatus constructed according to my invention and which can be used in carrying out my novel method.

Fig. 2 is another partial longitudinal sectional view of the same apparatus but with the mold cavity in a different position.

Fig. 3 is a view similar to Fig. 2 but with the mold cavity shifted to the cooled section of the mold body, and Fig. 4 is another partial longitudinal sectional view of the apparatus with the slidable plungers thereof moved to the article discharging position.

Before proceeding with the detailed description, I wish to point out that my invention can be embodied in numerous different forms of molding apparatus and is applicable to the production of a variety of molded articles. The invention is especially useful for producing articles molded from thermoplastic or thermosetting materials. In the embodiment of the invention shown in the accompanying drawing, the article being molded is a hollow cap 10 having an internal screw thread 11. The cap is here shown as having a transverse end or top wall 12 and a cylindrical annular skirt 13, although articles of other than cylinder shape can be produced by my novel method and apparatus.

In Fig. 1 I show my novel molding apparatus as including a mold body 15 having an opening or bore 16 therein in which a pair of opposed plungers 17 and 18 are slidably operable for defining a mold cavity 19 in a portion of such opening or bore. My molding apparatus also includes a device 20 for supplying plastic or thermoplastic material 21 under pressure to the mold cavity 19.

The mold body 15 may be of a sectional construction, as shown in the drawing, comprising a guiding or supporting section 22, an intermediate heated section 23 and an upper or outer cooled section 24. These sections are suitably connected together so that the opening or bore 16 extends through the sections as a smooth and continuous passage in which the plungers 17 and 18 slidably operate. The heated intermediate section 23 is partially isolated from the adjacent sections 22 and 24 by intervening air spaces 25 and 26, for retarding the transfer of heat from the section 23 to such adjacent sections. The intermediate section 23 can be heated by any suitable means such as the heating coil 27 embodied therein and to which a suitable heating fluid or medium may be supplied. The cooled section 24 is constructed with a passage or space 28 therein to which a suitable medium can be supplied for cooling this section of the mold body. The heated section 23 is also provided with a passage 29 which communicates with the mold cavity 19 and through which the plastic material can be supplied under pressure to the die cavity.

The device 20 for supplying the moldable material may be of a conventional form comprising a body 31 having a cylinder 32 therein adapted to contain the material 21 and in which a plunger 33 slidably operates for subjecting such material to pressure. The inner end of the cylinder 32 is tapered to form a discharge passage 34 and carries a nozzle 35 which connects such passage with the supply passage 29 leading to the die cavity 19. A heating coil 36 disposed around the body 31 supplies heat to the cylinder and the material contained therein. Thermal insulating material 37 surrounds the heating coil 36 to retard the loss of heat therefrom. As is usual in devices of this kind, a spreader 38 is provided in the cylinder 32 for deflecting the plastic material toward the side walls of the cylinder so that it will be more readily heated by the coil 36. The plunger 33 may be suitably actuated as by means of a piston contained in the cylinder 39.

In Fig. 1 of the drawing I show the plungers 17 and 18 with their inner ends in adjacent relation so as to define the mold cavity 19 in a portion of the bore 16 lying within the heated zone or section 23 of the mold body. The inner end of the plunger 17 is of a shape corresponding with the shape of the end wall 12 of the article and the inner end of the plunger 18 carries a threaded projection 40 which extends into the mold cavity and serves as a core for forming the internally threaded recess in the article 10. The position of the plungers at this time is such that the mold cavity 19 will be in communication with the supply passage 29, preferably with the latter leading into the mold cavity at a point closely adjacent the inner end of the plunger 17. The molding operation as illustrated in Fig. 1 is at the point or stage where the thermoplastic material 21 has been supplied under pressure to the cavity 19 so as to fill the latter and form the molded article 10 therein.

In Fig. 2 I show the plungers 17 and 18 as having been shifted in the bore 16 so as to disconnect the cavity 19 from the supply passage 29. During this movement of the plungers the inner end of the plunger 17 acts as a cut-off member which severs the stream of thermoplastic material at the point of its junction with the article 19 being molded and thereafter seals the supply passage. Since the orifice 29a or point of connection of the passage 29 with the cavity 19 lies in or is coincident with the inner wall or surface of the bore 16, it will be seen that when the plunger 17 severs the stream or stem of plastic material there will be no flash or gate section adhering to the molded article 10 nor will there be any mark or irregularity left on the surface of the article. Likewise there will be no gate section or similar piece of scrap material to be removed from the supply passage 29 before the succeeding molding operation.

The movement of the plungers 17 and 18 to disconnect the cavity 19 from the supply passage 29, as just described, is a conjoint movement and preferably shifts the die cavity 19 only a relatively short distance so that this cavity remains temporarily within the heated section 23 of the mold body. Fig. 2 shows the mold cavity as having been shifted to such a temporary position in the heated section 23 and at this point a relative closing movement is applied to one or both of the plungers so as to subject the article 10 to an increased molding pressure. This increased pressure squeezes the article so as to reduce the porosity of the material being molded which results in a desired increase in the density and strength of the molded article in relation to the thickness of its walls.

In Fig. 3 I show the plungers 17 and 18 as having been moved conjointly to a second intermediate or temporary position by which the mold cavity 19, with the article 10 therein, is shifted out of the heated section 23 and into the cooled zone or section 24. At this point a cooling of the article takes place to further solidify and harden the same.

Fig. 4 shows the plungers 17 and 18 as having been moved to an article discharging station 41 in which the plunger 17 preferably projects partway out of the bore 16 and the plunger 18 has been moved to a spaced position away from the plunger 17. Because of the interengagement between the molded article 10 and the threaded projection 40 of the plunger 18, the article will move with the latter plunger away from the plunger 17. The molded article can then be manually removed from the plunger 18 by unscrewing the same from the threaded stem 40. This operation can, if desired, be expedited by the use of suitable mechanical means including a disk or roller 42 having a soft rubber rim 43 which frictionally engages the skirt of the molded article 10 and rapidly unscrews the same from the threaded stem 40. Upon being unscrewed from the stem 40 the article 10 is permitted to drop freely away from the plunger 18. Immediately after the removal of the molded article 10, as just described, the plungers 17 and 18 return to the position shown in Fig. 1 for the next molding operation.

Although I have described my method as including the intermediate step illustrated in Fig. 2 in which the article 10 is subjected to an increased molding pressure, this step can be omitted if desired in which case the cooperating plungers 17 and 18 shift the die cavity 19 from the position shown in Fig. 1 to the position shown in Fig. 3. Likewise it will be understood that the movement of the plungers 17 and 18 from one position to another can be carried out either as a continuous or intermittent movement and at any desired rate, depending upon the characteristics of the material being molded, the size and shape of the article being formed and the heating and cooling requirements of the mold cavity and the material being molded.

The plungers 17 and 18 can be actuated by any suitable mechanism, for example, the plunger 17 can be moved by a cam 45 of appropriate contour against which this plunger is held by gravity or spring pressure. The plunger 18 can be actuated by a piston operable in a cylinder 46 and subjected either to fluid pressure or spring pressure, or a combination of such pressures. The cam 45 can be driven by any suitable power means and the operation of the cam and cylinder 46 can be controlled by any appropriate mechanism to produce the above-described timed steps or sequence of operations of the plungers 17 and 18.

From the foregoing description and the accompanying drawing, it will now be readily understood that I have provided a novel method and apparatus for molding plastic or thermoplastic material by which various articles can be rapidly and economically produced and such articles will be of a superior quality and devoid of flash, gate marks or other irregularities and will require no trimming operation subsequent to the molding thereof.

While I have illustrated and described my novel molding apparatus and method in considerable detail it will be understood, of course, that I do not wish to be correspondingly limited but regard my invention as including all changes and modifications coming within the spirit of the invention and the scope of the appended claims.

Having thus described my invention, I claim:

1. The method of molding articles from thermoplastic material or the like which comprises, forming a mold cavity between a pair of plungers slidable in a stationary mold body having a heated section and a cooling section, supplying heated thermoplastic material to said cavity under pressure while the latter is in said heated section, moving said plungers first conjointly in a substantially fixed spaced relation to each other to cut off the supply of said material to the cavity and then relatively to each other to subject said material to an increased molding pressure, and then again moving said plungers conjointly in a substantially fixed spaced relation to each other to shift said mold cavity with the molded article therein to said cooling section.

2. The method of molding articles from thermoplastic material or the like which comprises, moving a pair of opposed plungers in a mold body to a spaced relation defining a mold cavity therebetween in the mold body, supplying said thermoplastic material to said mold cavity through an opening of said mold body, then moving said plungers conjointly in a substantially fixed spaced relation to each other to cut off the supply of said material to the mold cavity, next causing a relative closing movement between the plungers for applying molding pressure to the material in said mold cavity, and then again moving said plungers conjointly in the same direction as the first conjoint movement to carry the molded article out of said mold body.

3. The method of molding articles from thermoplastic material or the like which comprises, moving a pair of opposed plungers in a mold body to a spaced relation defining a mold cavity therebetween in the mold body, supplying said thermoplastic material to said mold cavity through an opening of said mold body, then moving said plungers conjointly in a substantially fixed spaced relation to each other to cut off the supply of said material to the mold cavity, next causing a relative closing movement between the plungers for applying molding pressure to the material in said mold cavity, then again moving said plungers conjointly to carry the molded article out of said mold body, and utilizing one of said plungers for maintaining said supply opening closed during the movements of the plungers following the feeding of said plastic material into the mold cavity.

4. The method of molding articles from thermoplastic material or the like which comprises, moving a pair of opposed plungers in a mold body to a spaced relation defining a mold cavity therebetween in the mold body, supplying said thermoplastic material to said mold cavity through an opening of said mold body, then moving said plungers conjointly in a substantially fixed spaced relation to each other to cut off the supply of said material to the mold cavity, next causing a relative closing movement between the plungers for applying molding pressure to the material in said mold cavity, then again moving said plungers conjointly in the same direction as the first conjoint movement and in a substantially fixed spaced relation to each other to carry the molded article out of said mold body, and finally causing a relative separating movement between said plungers for releasing the article from between the plungers.

5. The method of molding articles from thermoplastic material or the like which comprises, moving a pair of opposed plungers in a mold body having a heated section and a cooled section so as to bring the plungers to a spaced relation defining a mold cavity therebetween in the heated section of the mold body, supplying said thermoplastic material to said mold cavity through an opening in the heated section of the mold body, then moving said plungers conjointly and in a substantially fixed spaced relation to each other to cut off the supply of said material to the mold cavity, next causing a relative closing movement between the plungers for applying molding pressure to the material in said mold cavity, and then again moving said plungers conjointly in the same direction as the first conjoint movement to carry the molded article through said cooling section to a point outside the mold body.

6. The method of molding articles from thermoplastic material or the like which comprises, moving a pair of opposed plungers in a mold body having a heated section and a cooled section so as to bring the plungers to a spaced relation defining a mold cavity therebetween in the heated section of the mold body, supplying said thermoplastic material to said mold cavity through an opening in the heated section of the mold body, then moving said plungers conjointly and in a substantially fixed spaced relation to each other to cut off the supply of said material to the mold cavity, next causing a relative closing movement between the plungers for applying molding pressure to the material in said mold cavity, then again moving said plungers conjointly in the same direction as the first conjoint movement and in a substantially fixed spaced relation to each other to carry the molded article through said cooling section to a point outside the mold body, and finally causing a relative separating movement between said plungers for releasing the article from between the plungers.

7. In molding apparatus the combination of, a stationary mold body having heated and cooled sections and a bore therein extending through said sections, said body having a supply passage therein for plastic material and opening into the bore at a point in said heated section, a pair of opposed plungers movable in said bore to a spaced relation defining a mold cavity in said heated section, means for discharging plastic material into said mold cavity through said opening, said plungers being movable simultaneously in the same direction and in a substantially fixed spaced relation to each other to cut off the mold cavity from said supply opening and then relative to each other for subjecting said material to molding pressure in said cavity, the plungers being thereafter movable simultaneously in the same direction for carrying the molded article through said cooling section and out of said mold body, and actuating devices for the respective plungers and cooperating to produce such movements of the plungers in sequential relation.

LEE B. GREEN.